May 14, 1968    M. MAYRATH    3,382,967
VARIABLE-ANGLE AUGER CONVEYOR
Filed Feb. 13, 1967    2 Sheets-Sheet 1
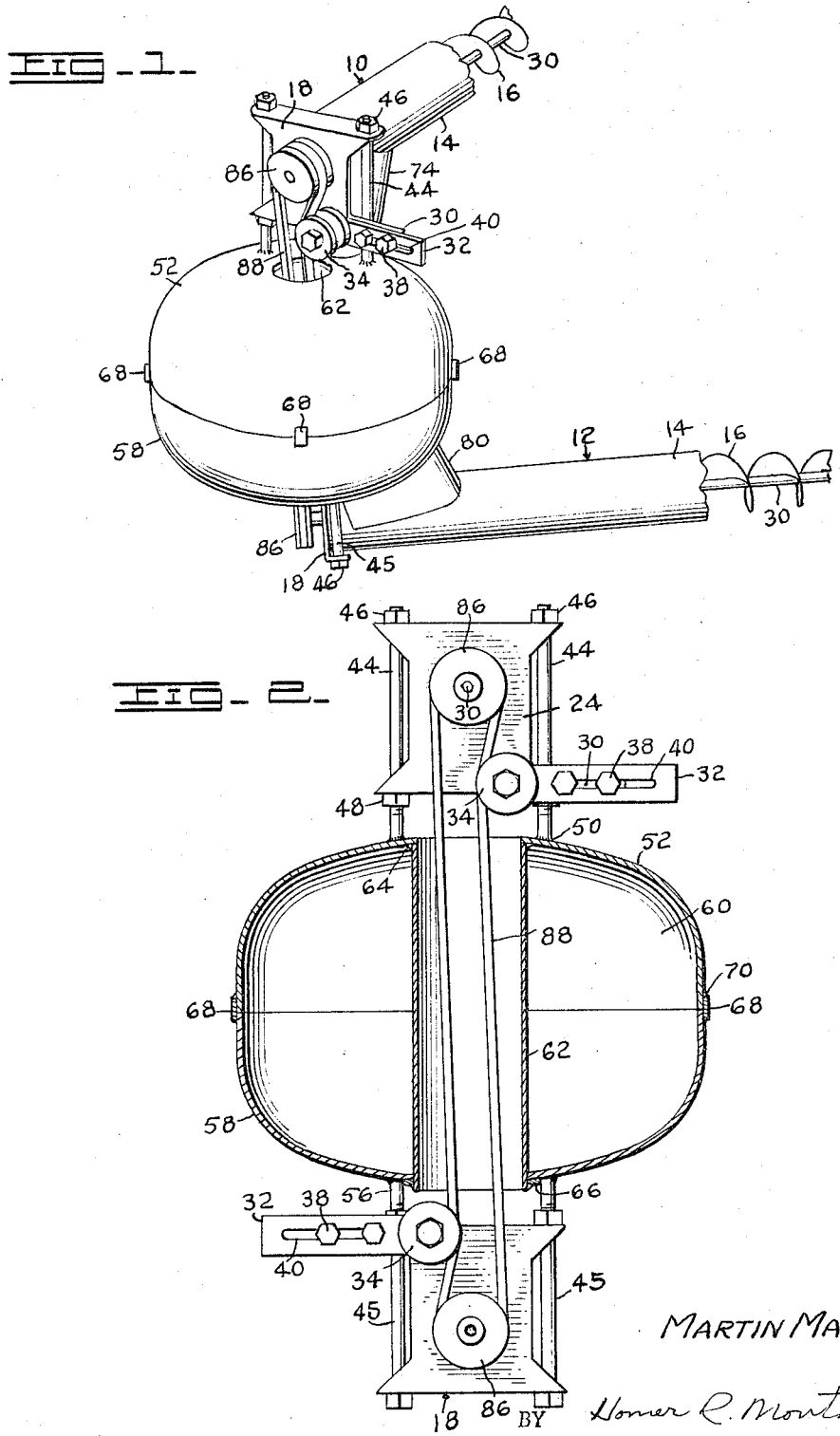
INVENTOR
MARTIN MAYRATH
BY Homer R. Montague
ATTORNEY

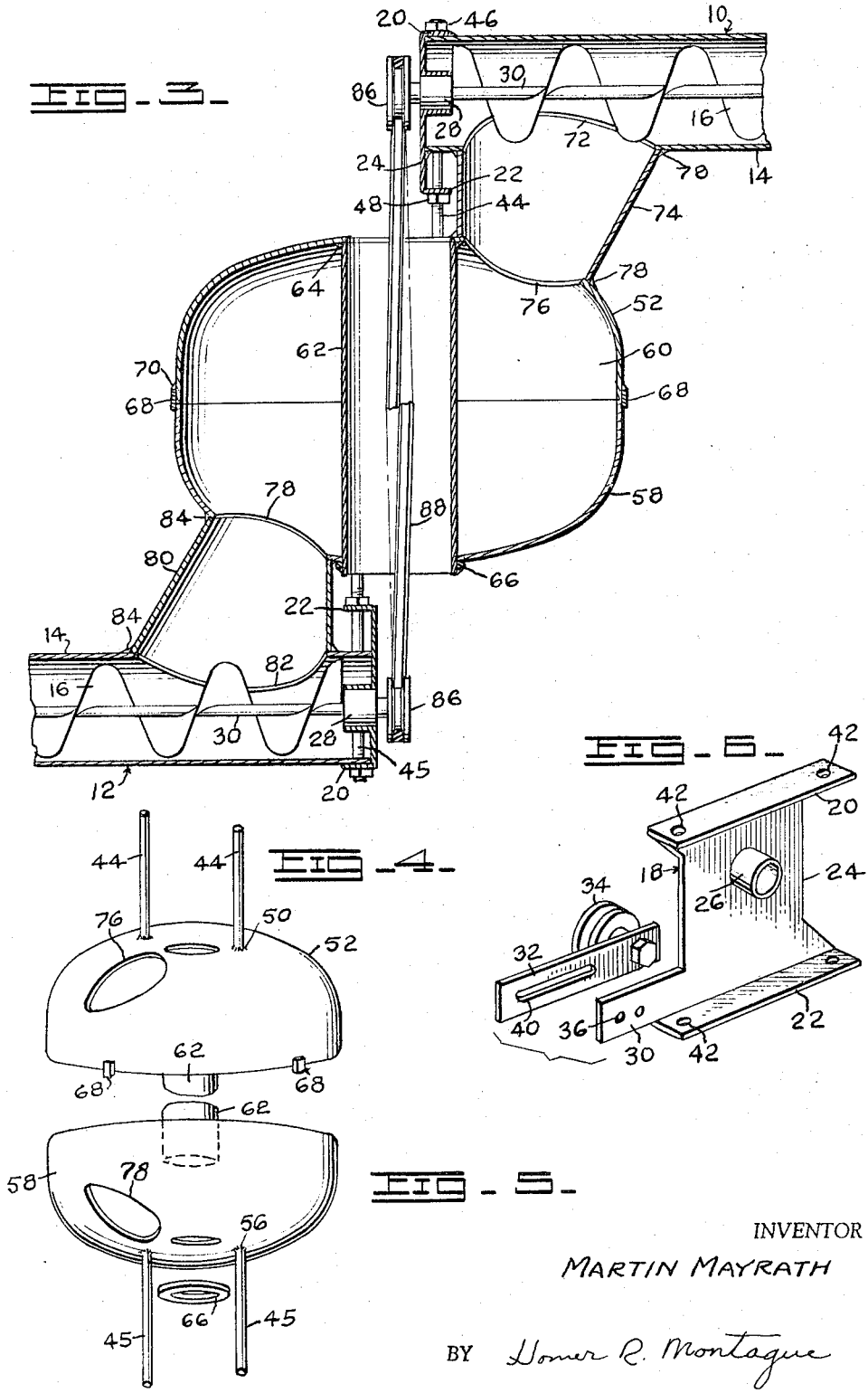

United States Patent Office 3,382,967
Patented May 14, 1968

3,382,967
VARIABLE-ANGLE AUGER CONVEYOR
Martin Mayrath, 10707 Lennox Lane,
Dallas, Tex. 75229
Filed Feb. 13, 1967, Ser. No. 615,666
9 Claims. (Cl. 198—92)

ABSTRACT OF THE DISCLOSURE

Two auger conveyors mounted to swing in parallel planes relative to each other are connected by relatively rotatable hollow, generally hemispherical bells within which, and about whose common axis, lies a hollow tube through which passes an auger drive connecting belt; the material being conveyed passes from bell to bell outside of the tube.

BACKGROUND OF THE INVENTION

When auger conveyors are used to convey materials along paths which include significant changes of direction, it is desirable to employ conveyor sections which are coupled both for material transfer and for drive power. This avoids the need for separate prime movers, but presents difficult problems as the direction-change angles increase, such as occurs when material has to be conveyed around dairy barns, poultry houses and the like, and from horizontal to vertical paths. It is therefore desirable to provide ways and means by which almost any conceivable change of direction can be accommodated, without loss of driving efficiency and without leakage of grain or like siftable material at the connection point. Heretofore, separately-driven augers, with patched-up material transfers, have mostly been used for the purpose, and these are inefficient, and difficult to adjust in position.

SUMMARY OF THE INVENTION

The invention solves the problem presented by providing each of the adjacent ends of two conveyor sections, each having its own auger and auger shaft, with a generally hemispherical hollow bell, so that when the two halves or bell-sections are fitted together for rotation about their meeting plane, complete angular adjustment of the two conveyor sections in one plane can be performed. The auger tubes communicate with their respective bell halves through lateral walls thereof, by means of hollow shrouds preferably welded to the auger tubes and the respective bell walls. This leaves the respective auger shafts both projecting across the axis of the relatively rotatable bell sections, and they are fitted with pulleys and idlers so that a connecting belt can extend from pulley to pulley through a central tube which surrounds the bell axis internally of its cavity, the tube being welded to one of the bell sections and aiding in the swinging rotation thereof. Thus the power drive passes along an axis of the generally hollow bell unit as assembeld, while the material being conveyed passes inside of the effectively sealed bell unit but outside of the connecting tube through which the belt passes from auger-shaft pulley to auger-shaft pulley.

BRIEF DESCRIPTION OF THE DRAWING

FIGURE 1 is a perspective view of the invention showing the conveyors arranged at an angle to each other, the conveyors being broken away.

FIGURE 2 is a vertical sectional view through the conveyor connecting means showing the parts as they will appear when the conveyors are one above the other and project in the same direction.

FIGURE 3 is a similar sectional view taken through the connecting means and through parts of the two conveyors when the latter are 180 degrees apart.

FIGURE 4 is a perspective view of the upper bell-like connecting member.

FIGURE 5 is an underside perspective of the other bell-like connecting means; and FIGURE 6 is a perspective view of a conveyor end plate and the idler pulley arrangement adapted to be carried thereby.

DESCRIPTION OF THE PREFERRED EMBODIMENT

Referring to the drawings, the numerals 10 and 12 indicate as a whole two auger conveyor sections each including conveyor tubes 14 and augers 16. An end plate 18 is fixed in any suitable manner to one end of each conveyor tube 14 and is constructed, as clearly shown in FIGURE 6, to include upper and lower flanges 20 and 22 and an intervening flat plate portion 24 carrying a supporting sleeve 26 for a bearing 28 for the shaft 30 of the associated auger. Each plate unit 18 is preferably provided adjacent the bottom thereof with a lateral projection 30 to which is secured an elongated bar 32 rotatably supporting at one end an idler pulley 34. The projection 30 is provided with bolt holes 36 to receive bolts 38 (FIGURE 2) projecting through a slot 40 in the plate 32.

The flanges 20 and 22 of each plate unit 18 are provided with openings 42 to receive parallel rods 44, 45 on which are threaded nuts 46 and 48 arranged at and engaging remote sides of the flanges 20 and 22, respectively. The lower ends of the upper rods 44 are welded as at 50 to an inverted bell-like member 52 to be rigid therewith, and it will be apparent that the member 52 is thus fixed with respect to the upper conveyor 10.

The plate unit 18 of the lower conveyor 12 is identical with that shown in FIGURE 6 and carries an identical plate and pulley assembly 32, 34.

The parallel rods 45 pass through the openings 40, 42 of the lower plate unit 18 and are welded as at 56 to a lower bell-like member 58. It will be apparent that the two bell-like members 52 and 58 open into each other to form a space 60 through which material flows in the manner to be described.

An axial tubular member 62 extends through the members 52 and 58 and is welded as at 64 to the upper member 52 and opens therethrough. The lower end of the tubular member 62 extends through the lower bell-like member 58 and has welded thereto a ring 66 to maintain the two bell-like members rotatably assembled relative to each other. Externally of the members 52 and 58, clips 68 are welded as at 70 to the upper member 52 and project downwardly over the upper edge of the member 58, thus acting as guides for the members 52 and 58 in their turning movement relative to each other.

The tube of the upper conveyor 10 is cut away as at 72 (FIGURE 3) to feed material from the tube through a hopper 74 and through an opening 76 in the upper member 52. The hopper 74 is welded as at 78 to the tube 14 and member 52. Thus material will flow from the upper conveyor into the space 60 and will be discharged through an opening 78 in the lower member 58 into a hopper 80 and thence through an opening 82 into the tube of the lower conveyor 12. The hopper 80 is welded as at 84 to the lower member 58 and to the tube of the lower conveyor 12.

The shafts 30 of the two conveyors are provided beyond the ends of their respective tubes with the usual drive pulleys 86 around which passes a belt 88. As shown in FIGURE 2, this belt passes around the idler pulleys 34 which serve to maintain the intervening conveyor runs relatively close to each other where they pass through the tubular member 62, and the idlers also assist in guiding the belt around the pulleys 86. When the two conveyors are arranged one above the other and project in the same direction as in FIGURE 2, the idlers 34 will be at opposite sides of the belt 68.

OPERATION

Either of the auger shafts 30 may be conveniently driven in any suitable way, and such drive forms no part of the present invention. Material will be fed to the end of the upper conveyor 10 broken away in FIGURE 1 and will be moved therethrough for discharge through the hopper 74 into the space 60, and the material thence flows from such space into the conveyor 12 through the hopper 80. The material will be fed toward the left in the conveyor 12 as viewed in FIGURE 3. Assuming that the shaft of the upper conveyor 10 is the driven shaft, it will transmit driving force through the belt 88 to the shaft 30 of the lower auger. Material may be discharged from the broken-away end of the lower conveyor. The two bell-like members 52 and 58 are thus connected together for axial turning movement relative to each other. The tubular member 62 is fixed at its upper end to the member 52 and lower member 58 turns on this tubular member 62. The clips 68 serve to maintain the two members 52 and 58 in proper turning relation to each other.

In FIGURE 1, the two conveyors are arranged at approximately 45 degrees to each other. It will be apparent that the lower conveyor is adapted to be swung to any desired position in a plane parallel to the upper conveyor. This turning movement of the two conveyors relative to each other is accompanied by the twisting of the belt 88, as suggested, for example, in FIGURE 3. The two conveyors may be arranged at right angles to each other for conveying material around a dairy barn, poultry house or the like, or the conveyors may be arranged 180 degrees apart as in FIGURE 3 where it is desired to convey material in the same direction and discharge it at a lower level.

It is not necessary that the two conveyors be maintained horizontal, since they will function properly even when tilted. For example, FIGURE 3 may be considered to be a horizontal section in which case either conveyor 10 or 12 may be turned to a vertical position to feed material from the upper to the lower conveyor.

The mounting of the bolts 30 permits reasonable adjustment of the belt tensioning. However, with the new type of small-section high strength nylon and other plastic belts, such tension adjusting means is usually unnecessary. Belts of the type referred to may be pre-stretched about 3% to 5% of their lengths, when new, in which case no belt tightening will be necessary during the life of the belt.

It will be obvious that the tubular member 62 provides a passageway for the belt to drive one auger from the other and such passageway is closed to the space through which flows the material being conveyed. The rods 44 serve as effective means for rigidly connecting each bell-like member 52 and 58 to its associated conveyor tube, thus serving to maintain the elements of each turnable bell unit in proper position with respect to each other. As stated, the idlers 34 minimize the lateral distance between the runs of the belt through the tubular member to prevent any contact of these elements with each other or with other parts, and they serve to guide the belt to assure its passing around the pulleys 86.

From the foregoing it will be apparent that the bell-like members 52 and 58 and hoppers 74 and 80, together with the tube 62, serve two highly important functions. The elements referred to constitute means for connecting the two conveyors and supporting them relative to each other for turning movement in parallel planes on an axis transverse to the axes of the conveyors, and for forming sealed passage means for the flow of material from one conveyor to the other. The tube 62 forms part of the passage means since the material flows around the tube, and it also will be noted that the tube provides for the free movement of the drive belt 88 between the two sets of pulleys. The two centers of pulleys 86 lie in a plane or planes coincident with the axis of the tube 62, and when the conveyors are turned relative to each other, it merely effects a twist in the drive belt without the transmission of any lateral forces thereto.

It will be seen that the invention satisfies its stated purposes in a very simple, economical yet effective manner, but the construction described can be varied in detail without departing from the true spirit and scope of the invention as defined in the appended claims.

What is claimed is:

1. A dual auger conveying mechanism comprising a pair of auger conveyors offset from each other in parallel planes, and common means connecting adjacent ends of said conveyors for supplying material from the outlet of one conveyor to the inlet end of the other conveyor and for supporting said conveyors for turning movement relative to each other on an axis transverse to the axes of both said conveyors, said auger of each conveyor is provided with a shaft, a pulley on each shaft beyond one end of the associated conveyor, a belt connecting said pulleys, said common means including a tubular coaxial member extending therethrough and through which the said belt extends.

2. A mechanism according to claim 1 wherein said common means comprises a two-part hollow structure, one part of which is fixed with respect to one conveyor and the other of which is fixed with respect to the other conveyor, means for connecting said hollow members to each other for turning movement on said axis transverse to the axes of said conveyors, and means for supplying material from the outlet end of said one conveyor to one part of said hollow structure and for supplying such material from the other part of said hollow structure to the inlet end of said other conveyor.

3. Apparatus according to claim 1 wherein said common means comprises a pair of bell-like members having free edges of corresponding shape and size contacting each other, means for mounting said bell-like members for turning movement on said axis transverse to the axes of said conveyors, means for supplying material from the outlet end of one conveyor to one of said bell-like members, and means for supplying material from the other bell-like member to the inlet end of the other conveyor.

4. Apparatus according to claim 3 wherein said means for supplying material from the outlet end of one conveyor to one of said bell-like member is fixed to such conveyor and to such member, said means for supplying material from said other bell-like member to said other conveyor being fixed to said bell-like member and to such other conveyor.

5. A mechanism according to claim 1 wherein said common means comprises a two-part hollow structure, one part of which is fixed with respect to one conveyor and the other of which is fixed with respect to the other conveyor, means for connecting said parts of said hollow structure to each other for turning movement on said axis transverse to the axes of said conveyors, means for supplying material from the outlet end of said one conveyor to one of said parts and for supplying such material from the other of said parts to the inlet end of said other conveyor, said means for connecting said parts of said hollow structure for relative turning movement comprising an axial tube passing through said members, said tube being fixed to one of said parts and connected for rotary movement relative to the other of said parts, the connection between said tube and said other part engaging the latter externally thereof to prevent axial separation of said parts.

6. A dual auger conveyor mechanism comprising a pair of auger conveyors offset from each other with their axes in parallel planes, a plate structure closing one end of each conveyor and providing a bearing support for the shaft of the associated conveyor, a pulley mounted on one end of the shaft of each auger conveyor, a belt passing around said pulleys to drive one auger conveyor from the other, and common means connecting said conveyors to each other for turning movement on an axis transverse to the axes of said shafts and for supplying material from the outlet end of one conveyor to the inlet end of the other conveyor, said common means including a tubular member passing entirely therethrough and through which said belt extends.

7. A mechanism according to claim 6 wherein said common means comprises a pair of bell-like members having open ends of corresponding shape and size rotatably engaging each other, means for fixing each bell-like member to the associated plate structure, said common means further including a hopper connecting and fixed to the outlet end of one conveyor and to one of said bell-like members, and a hopper connecting and fixed to the other bell-like member and to the inlet end of the other conveyor.

8. Apparatus according to claim 7 wherein said tubular member is fixed at one end of said bell-like members with its axis coincident with the axis turning movement of said conveyors relative to each other, said tubular member projecting through the other bell-like member and provided externally of the latter with a collar engaging the latter bell-shaped member to prevent movement of said bell-like members axially away from each other.

9. Apparatus according to claim 8 provided with an idler pulley carried by each plate structure, said idler pulleys respectively engaging the runs of said belt between said first named pulleys to narow the space between said runs where the latter extend through said tubular member, and clips fixed to the edge portion of one of said bell-like members and extending over the edge of the other bell-like member to form, with said tubular member, means for guiding said bell-like members for relative turning movement on their common axes.

References Cited
UNITED STATES PATENTS

| | | | |
|---|---|---|---|
| 1,437,382 | 11/1922 | Stephenson | 198—64 |
| 1,518,898 | 12/1924 | Brunner | 198—64 |

RICHARD E. AEGERTER, *Primary Examiner.*